United States Patent [19]
Kitai et al.

[11] 3,810,223
[45] May 7, 1974

[54] OPERATING DEVICE FOR FOCAL PLANE SHUTTER BLADES FOR CAMERA

[75] Inventors: Kiyoshi Kitai, Tokyo; Eiichi Onda, Saitama; Mitsuo Koyama, Chiba; Shinji Nagaoka, Chiba; Tadashi Nakagawa, Chiba, all of Japan

[73] Assignee: Seiko Koki Kabushiki Kaisha, Tokyo, Japan

[22] Filed: Mar. 21, 1973

[21] Appl. No.: 343,500

[30] Foreign Application Priority Data
March 21, 1972 Japan............................32226

[52] U.S. Cl. .................................................. 95/59
[51] Int. Cl. ............................................. G03b 9/08
[58] Field of Search ...................... 95/55, 58, 59, 60

[56] References Cited
UNITED STATES PATENTS

| | | | |
|---|---|---|---|
| 3,160,084 | 12/1964 | Chatani | 95/60 X |
| 3,078,776 | 2/1963 | Okabe | 95/55 |
| 2,975,689 | 3/1961 | Chatani | 95/55 X |
| 2,927,519 | 3/1960 | Matsuda | 95/55 |

*Primary Examiner*—Joseph F. Peters, Jr.
*Attorney, Agent, or Firm*—Robert E. Burns; Emmanuel J. Lobato

[57] ABSTRACT

A focal plane shutter and shutter blade operating devices for a camera. The focal plane shutter has a plurality of shutter blades arranged in two separate groups operated independently of each other as a shutter-opening blade group and a shutter-closing blade group. A shutter blade operating mechanism comprises a pair of separate devices for opening and closing the shutter with the two groups independently of each other driven in the same direction. Each shutter blade-operating device has a slit-forming or aperture-forming shutter blade in each group driven separately from the other shutter blades of the groups. A main shutter blade-driving lever and an auxiliary parallel lever are both pivotally connected to each slit-forming shutter blade in each group of shutter blades. These two levers in each group of shutter blades are connected to the slit-forming blades with pivots in a common plane and with these pivots on the blade spaced equally from the respective centers of rotation of the parallel levers. The parallel levers function in a parallel arrangement to maintain aperture-forming straight edges travelling across the exposure aperture of the shutter uniformly.

2 Claims, 6 Drawing Figures

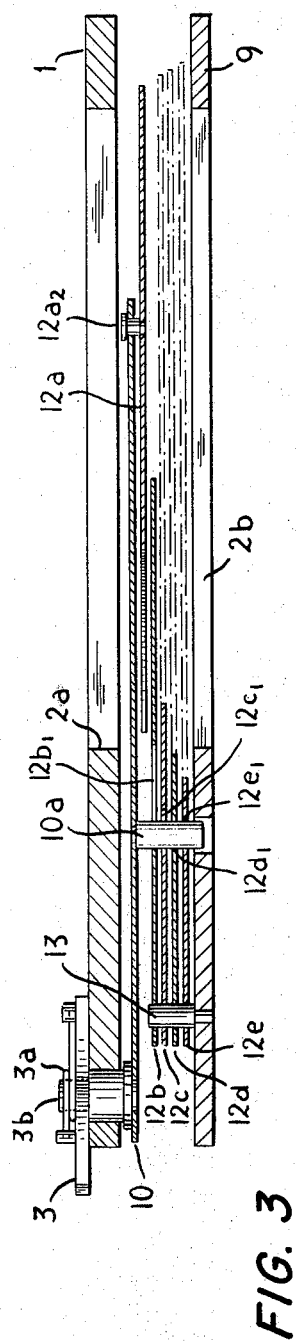
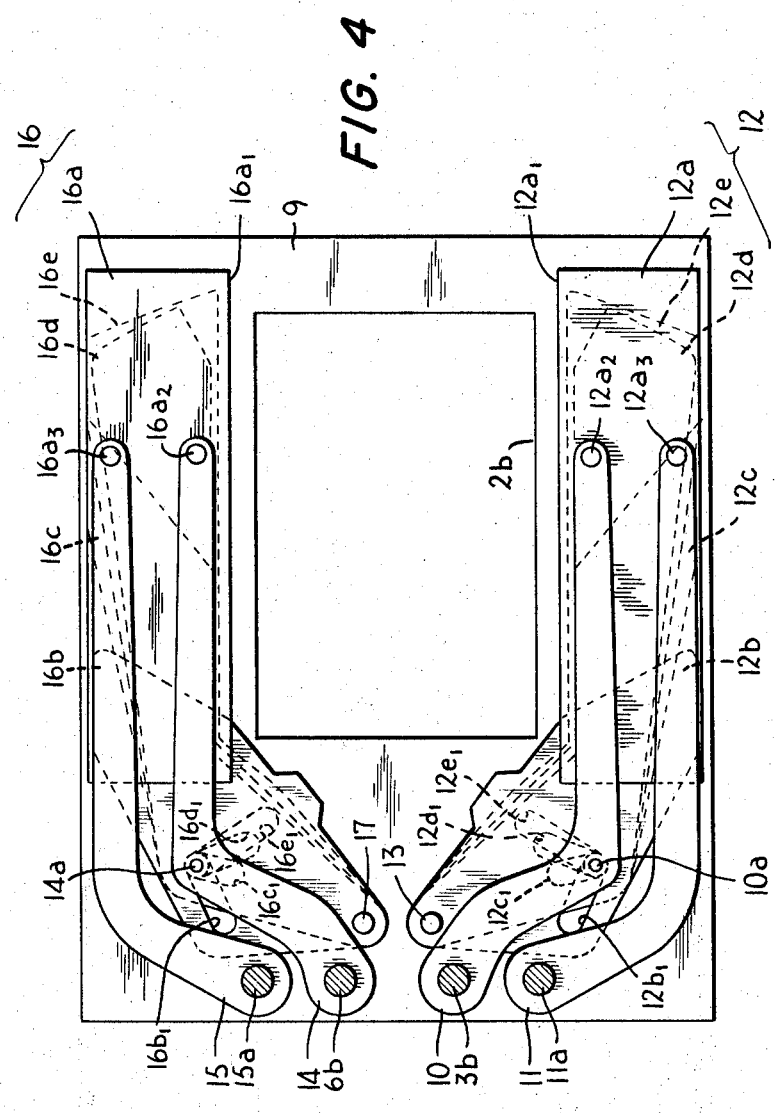

3,810,223

OPERATING DEVICE FOR FOCAL PLANE SHUTTER BLADES FOR CAMERA

BACKGROUND OF THE INVENTION

The present invention relates generally to camera shutters and more particularly to a new and improved focal plane shutter for a camera.

The use of a plurality of pivotally mounted shutter blades to open and close a shutter exposure aperture is known. Furthermore, the use of parallel control elements to control the formation of the shutter aperture is likewise known. In these known devices, all of the blades, even if they are divided into separate groups for opening and closing of the shutter, are mounted on the parallel levers or parts for driving them. Thus the inertia in driving the entire set of blades for a particular mode of operation limits the performance of the shutter as to maintaining accuracy in opening the shutter and accuracy in repetition of the motion of opening and closing the shutter.

With the advent of smaller size cameras, it has become necessary to have the shutter blades made smaller in focal plane shutters, and there is a limit to the complexity and the number of operating elements in the shutter. A particular problem has been the control of the slit-forming or aperture-forming blade of a group that controls the development of the opening and closing of the shutter aperture.

SUMMARY OF THE INVENTION

It is a principal object of the present invention to provide a smaller and more durable focal plane shutter with improved uniformity of slit-forming or aperture opening and closing.

In the focal plane shutter according to the invention, a plurality of shutter blades are divided into a shutter-opening group and a shutter-closing group. The shutter operating mechanism comprises a shutter-opening device which has a set of parallel levers pivoted at one end on a given side of the shutter aperture and a second set of parallel levers having their pivots spaced and substantially in the same plane as the before-mentioned levers. The two sets of parallel levers are pivotally mounted on a respective slit-forming shutter blade of the corresponding or respective group of shutter blades and the pivots thereof are in the same plane. In each set of parallel levers, the pivotal connections to the respective shutter blade are equally spaced from the center of rotation of the two corresponding levers.

The shutter-operating mechanism has driving and closing levers that operate the two sets of parallel levers for driving the blades in the same direction for opening and closing of the shutter. The two groups of shutter blades have the slit-forming shutter blade connected to a respective set of the parallel levers for forming the shutter aperture uniformly.

BRIEF DESCRIPTION OF THE DRAWINGS

Other features and advantages of the focal plane shutter in accordance with the present invention will be better understood as described in the following specification and appended claims, in conjunction with the following drawings, in which:

FIG. 3 is a cross section view taken along section line 3—3 of FIGS. 1 and 2;

FIG. 4 is a plan view of the interior of the focal plane shutter in FIG. 1 illustrating the shutter blades in an open condition;

DESCRIPTION OF THE PREFERRED EMBODIMENTS

Figure 1:
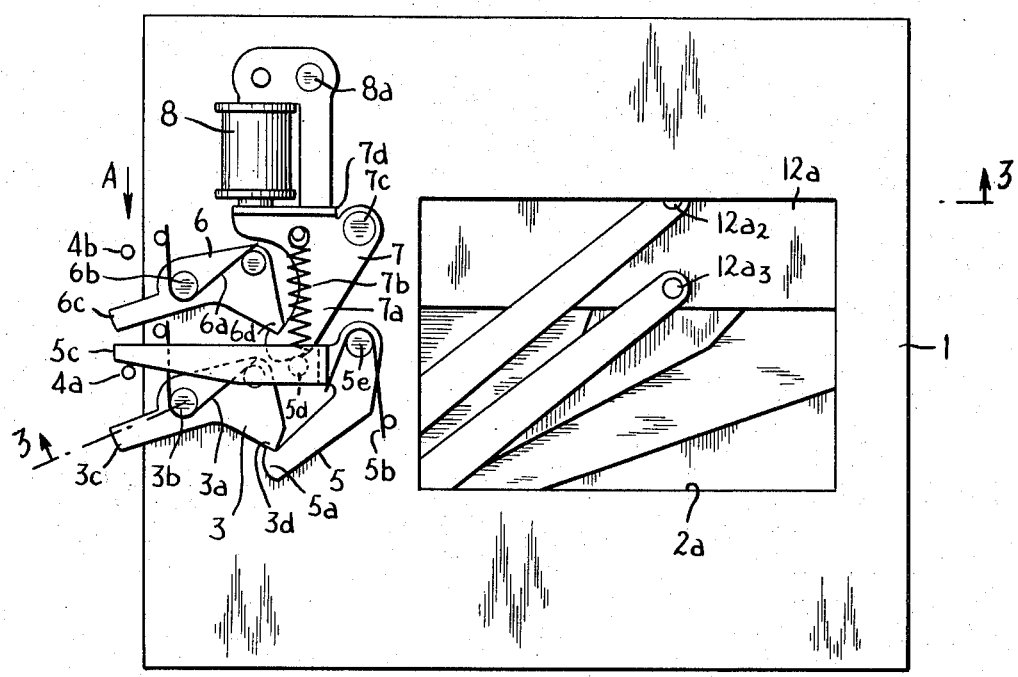
FIG. 1 is a plan view of a focal plane shutter in accordance with the invention and illustrated in a cocked condition.
Figure 2:
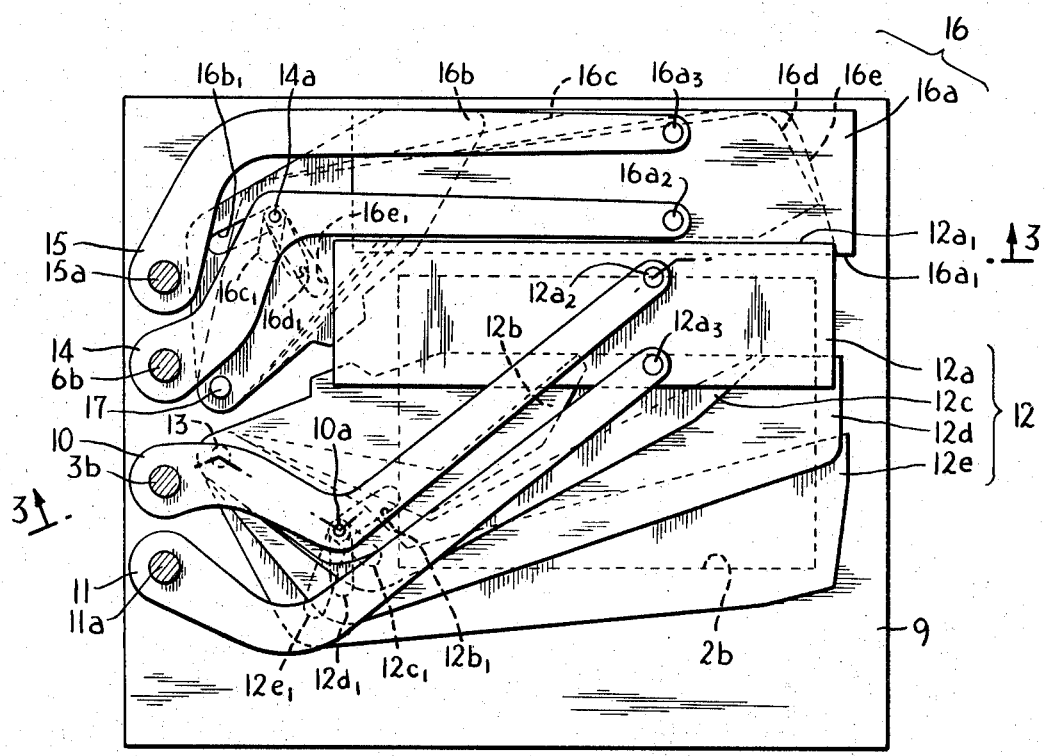
FIG. 2 is a plan view of shutter blades and mechanism arrangement within the shutter in the condition shown in FIG. 1.
Figure 5:
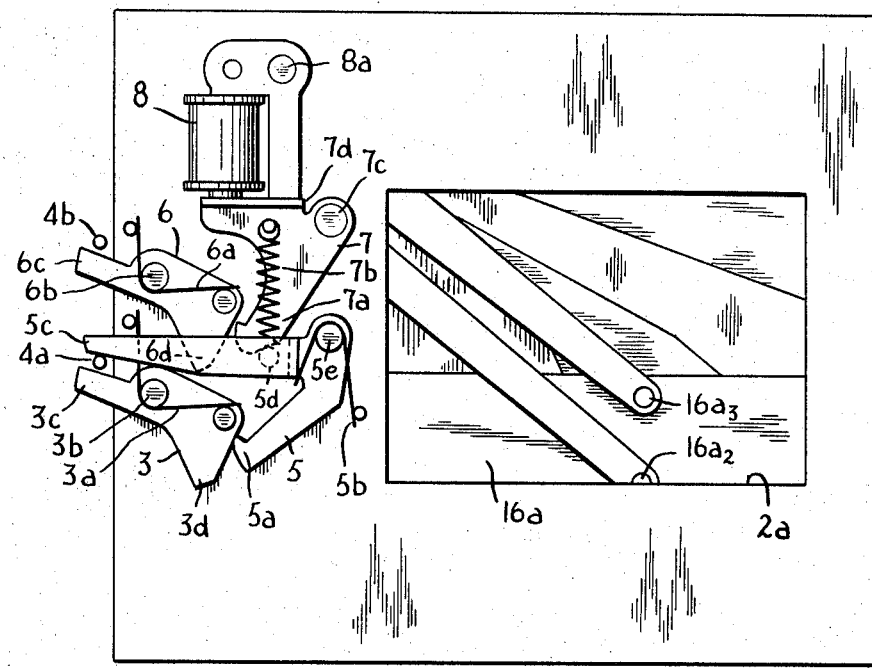
FIG. 5 is a plan view of the shutter in FIG. 4 illustrating the shutter with the shutter blades in a closed condition.
Figure 6:
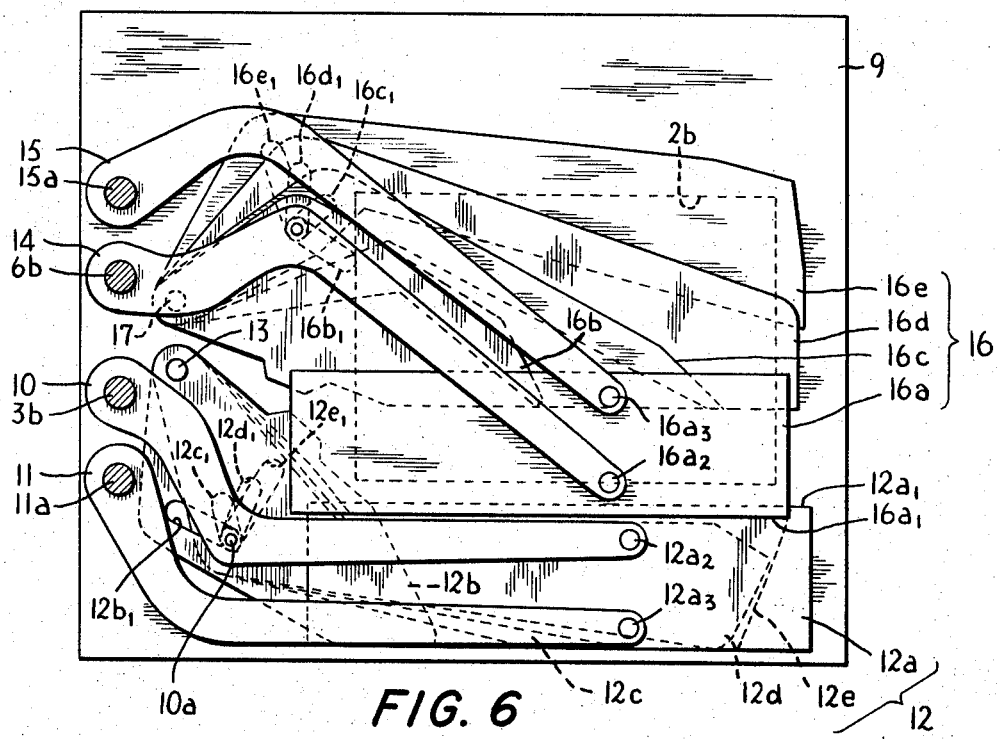
FIG. 6 is a plan view of the shutter blades within the shutter in the condition shown in FIG. 5.

The shutter according to the invention, as illustrated in the drawings, comprises a base board 1 having a window or shutter aperture 2a. On the base board are mounted devices for opening and closing the shutters, constituting the shutter-operating mechanism. These devices comprise a shutter-opening lever 3 biased in a clockwise direction, by a biasing spring 3a, about a pivot 3b. This is provided with an operating extension 3c. The shutter is shown in a cocked condition in FIG. 1 and cocking mechanism is diagrammatically illustrated by pins 4a, 4b movable in the direction of the arrow A.

A release lever 5 pivotally mounted on the base board is provided with a hook 5a for engaging and releasably holding the shutter-operating lever 3. The release lever is rotationally biased in a clockwise direction by a spring 5b about a pivot and has a second operating arm 5c on which is carried a pin 5d extending, in the drawing, downwardly on the underside of the operating arm.

The shutter-closing mechanism or device comprises a shutter-closing lever 6 pivotal on the base plate 1 on a pivot 6b and having an operating arm 6c actuated by the cocking mechanism and its pin 4b for cocking the shutter to the position illustrated in FIG. 1. A closing pawl 7 is provided and has an arm 7a biased in a counterclockwise direction by a spring 7b about a pivot 7c. The pawl is provided with a magnetizable or magnetic element 7d attractable by an electromagnet 8 secured by a fastener 8a on the base plate 1.

As indicated heretofore, the shutter is illustrated in FIG. 1 in a cocked condition. When the cocking mechanism is actuated, the cocking pin 4a engages the release lever arm 3c and rotates it into a position in which the release lever hook 5a engages it and holds it against the action of its spring 3a. In cocking the shutter, the cocking pin 4b engages the operating or cocking lever arm 6c of the closing lever 6 and rotates it in a counterclockwise direction so that the closing pawl releasably holds it with its hook 7a. When the release lever 5 is biased in a counterclockwise direction, its pin 5b engages a flat surface of the hook 7a and biases the pawl 7 in a direction for seating the magnetic element 7d against the electromagnet. In the position illustrated in the cocked condition, the pawl is releasably held and will be held in an attracted, releasable position when the electromagnet 8 is electrically energized when an exposure is being taken.

Within the shutter, a space is defined between the base plate 1 and a second plane 9 spaced therefrom and secured thereto by mounting means, not shown. Within this space on the underside of the base plate 1 is mounted a parallel system constituting an operating parallel lever 10 pivotal about the pivot pin $3b$ of the shutter-opening lever 3. A second parallel lever 11 is pivotal on a pin $11a$. The two arms are pivotally connected at pivot pins $12a_2$, $12a_3$ on a shutter-opening blade $12a$ which is an aperture-forming shutter blade or slit-forming shutter blade of a group of shutter-opening blades 12. The group of shutter-opening blades comprises the slit-forming blade $12a$ and a plurality of other shutter blades $12b$–$12e$ pivotal about a pivot 13. These shutter blades have elongated slots $12b_1$–$12e_1$ into which extends an operating pin $10a$ on the operating lever 10 for actuating these shutter blades as hereinafter described.

The aperture-forming shutter blade $12a$ is transported separately by the parallel levers 10, 11 and is not pivotally mounted in the manner of the other shutter blades of the shutter-opening group 12 of which it is a member. The pivotal connections $12a_2$, $12a_3$ to the parallel supporting levers 10, 11 are disposed in a common plane which is substantially a central plane passing within the straight boundaries of the exposure or shutter aperture $2b$. When the two parallel levers operate these pivotal pin connections move substantially along this same median plane. The two pivot connections are connected equally spaced from the centers of rotation $3b$, $11a$ of their respective levers. These centers of rotation are substantially disposed in a common plane. The manner of connection and the construction of these levers is such that when the two levers are operated, the aperture-forming blade $12a$ has a slit-forming edge $12a_1$ thereof move substantially normal to the plane in which the two pivotal pin connections $12a_2$–$12a_3$ are disposed. The latter two pin connections are normal to the plane of the shutter blade $12a$, so that the straight edge $12a_1$ defines a uniform slit as the aperture is opened or developed.

The shutter-closing mechanism constitutes two operating parallel levers 14, 15, pivotally mounted on the pivot $6b$ of the closing lever 6 and on a pivot $15a$ respectively. These two parallel levers are mounted relative to the exposure aperture $2b$ on the same side thereof. The centers of rotation of these two levers are in the same plane as the centers of rotation of the two shutter-closing parallel levers 10, 11. The two closing parallel levers 14, 15 support a shutter-closing, slit-forming shutter blade $16a$ of a group 16 of shutter-closing blades independently of the remaining, separate shutter-closing blades $16b$–$16e$ of the group 16. The shutter-closing blades $16b$–$16e$ are pivotally mounted to pivot about a pivot 17 and are provided with individually elongated slots $16b_1$–$16e_1$ within which is received an operating pin $14a$ transported by the shutter-closing lever 14.

OPERATION

When a photograph or exposure is to be taken, the camera exposure or release lever, not shown, is released or actuated. When a photograph is to be taken, the release mechanism of the camera will operate the electronic control circuit of the camera, not shown, so that the electromagnet 8 is energized and the magnetic part $7d$ of the closing hook or pawl 7 is maintained attracted even though mechanically released. The camera release mechanism, not shown, operates the operating arm $5c$ of the release lever, so that its engaging hook 5 is rotated in a counterclockwise direction against the action of its biasing spring $5b$, and the release hook $5a$ releases the hook $3d$ of the operating, shutter-opening lever 3, so that it is rotated in a clockwise direction by its biasing or operating spring. As the shutter-opening lever 3 is actuated, its pivot pin $3b$ is rotated so that the operating, parallel lever 10 is rotatably driven. As the operating, parallel lever 10 actuates the slit-forming opening shutter blade $12a$, the second parallel lever 11 assists in the movement of that shutter blade in a mode heretofore described. The movement of the parallel lever 10 carries the operating pin $10a$ along the respective elongated slots of the shutter-opening blades, so that they are operated sequentially to the open position in a superposed position illustrated in FIG. 4. The slit-forming blade is the trailing blade and its trailing edge $12a_1$ develops a uniform slit as the shutter is opened.

Once an exposure has been taken and the delay time has been automatically controlled by the control circuitry of the camera, not shown, the exposure is terminated by applying a signal to the control circuit, in a known manner, that de-energizes the electromagnet 8. When the electromagnet 8 is de-energized, the spring $7b$ of the closing pawl or lever 7 biases it in a direction for releasing the shutter-closing lever 6 which is accordingly released and its pivot $6b$ is rotated, thereby rotating the shutter-closing, parallel lever 14, which moves the shutter-closing blade $16a$ and its slit-forming, leading edge $16a_1$ to develop a uniform slit during closing of the shutter aperture.

The direction of movement of the shutter-closing blades to the superposed position is in the same direction in which the shutter-opening blades are operated. The movement of the parallel lever 14 transports along with it the associated parallel lever 15 to maintain the movement of the slit-forming shutter blade $16a$ as before described. Moreover, the movement of the main operating parallel lever 14 transports its operating pin $14a$ so that it moves along the respective slots $16b_1$–$16e_1$ to move the shutter-closing blades in sequence and spread them out in an arrangement which is fan-shaped, closing the shutter with the slit-forming shutter blade $16a$ being the advance shutter blade in the shutter-closing movement.

Those skilled in the art will recognize that while the closing pawl has been described as controlled by use of an electromagnet, it is possible to control its release by a mechanical delay mechanism. The arrangement of the two separate shutter blade groups reduces the inertia of the shutter blades so that the operating mechanism can operate them at a higher speed. Furthermore, the mounting of the slit-forming shutter blades for actuation and support by a respective set or pair of parallel levers, in the manner illustrated, as well as separately from the remainder of the related shutter blades within the respective groups, allows optimum control of the individual slit-forming blades and allows for making a uniform slit in opening or closing the shutter.

The use of parallel arms for operating the slit-forming shutter blades results in a more stable operation of these blades and the support points or connections pass, in both instances, along a central plane of the light-passage window or exposure apertures of the shutter. This greatly improves the uniformity of the slit developed when the shutter is opened and closed. Furthermore, dividing the arrangement in the manner in which it has been accomplished makes it possible to make the parallel arms smaller or to reduce the size of the focal plane of the shutter. The construction can likewise be made more simple.

What we claim and desire to secure by Letters Patent is:

1. In a focal plane shutter for a camera having means defining a shutter aperture, a shutter-opening group of shutter blades and a shutter-closing group of shutter blades, mechanism for operating the two groups of shutter blades independently of each other for opening and closing the shutter aperture, the improvement comprising two pairs of parallel levers in said mechanism each mounting a single, slit-forming shutter blade of a corresponding one of said groups of shutter blades for forming a uniformly formed aperture when the shutter aperture is opened and closed, means for pivotally mounting the remainder of shutter blades of each group of shutter blades for movement independently of the corresponding slit-forming shutter blade, and one of said parallel levers of each pair of levers having operating means for actuating said remainder of shutter blades of a corresponding one of said group of shutter blades, and means for actuating said pairs of levers independently in timed sequence.

2. In a focal plane shutter for a camera according to claim 1, in which each of the shutter blades of the remainder of shutter blades of each group of shutter blades has an elongated slot, and said operating means comprises a pin received in said elongated slots.

* * * * *